Patented Sept. 18, 1934

1,973,901

UNITED STATES PATENT OFFICE 1,973,901

PROCESS OF REFINING HYDROCARBON OILS

John W. Ingram, Pittsburgh, Pa., assignor to The Koppers Company of Delaware, a corporation of Delaware No Drawing. Application May 29, 1931, Serial No. 541,117

2 Claims. (Cl. 196—40)

This invention relates to the refining or purification of hydrocarbon oils and is of especial advantage with respect to the treatment of benzenoid hydrocarbon oils, such as light oils or benzols derived from coal gas. My invention may, however, be employed in the treatment of other hydrocarbon oils, such as oils derived from fuel gases other than coal gas and from petroleum.

Crude hydrocarbon oils ordinarily contain impurities generally comprising unsaturated hydrocarbons which are difficult to remove from the oils or from the various constituents of the oils in the usual distillation operations. This is by reason of the fact that such impurities are present in the oils in the form of compounds closely related to the desirable constituents of the oil with regard to volatility and boiling point, making separation of such impurities from the more valuable constituents of the oils practically impossible by distillation alone.

It is therefore the common practice to treat the crude or partially refined oils at some time previous to final distillation thereof in such manner as to cause the conversion of materials originally present as impurities to products of higher boiling points by polymerization or otherwise. The products of conversion thus obtained may either be withdrawn from the oil in the form of a sludge or may remain in the oil to be separated from other constituents of the oil in the course of subsequent distillation operations.

According to the method most generally employed, the hydrocarbon oil is washed with strong sulphuric acid, causing the formation of considerable amounts of sludge and the sludge and acid are then withdrawn from the oil which is then treated with a neutralizing agent such as a solution of caustic soda and finally distilled.

This practice is extremely disadvantageous by reason of the fact that it produces large quantities of acid sludge, respresenting not only a great loss of acid but the production of a valueless material, the disposal of which is extremely difficult. The disposal of the sludge is a serious problem as is also the recovery of the acid and neither of these problems had been successfully solved until quite recently. Moreover, the practice recited above results in considerable washing losses and can be carried out continuously only with considerable difficulty.

It has recently been proposed to accomplish the refining of hydrocarbon oils of the character described while washing the oil with sulphuric acid to cause the conversion of impurities to products of higher boiling points, followed by dilution of the acid while in the presence of the oil, so that products of conversion temporarily removed from the oil are returned to the oil in unobjectionable form.

As originally proposed, this process contemplated the use of concentrated sulphuric acid of 66° Baumé, but it was found that many oils, and more particularly American oils, especially light oils recovered from coal gas by means of absorbent oils derived from petroleum were of such character that if concentrated acid were employed in the initial stage the conversion of impurities would proceed to such a point that it was impossible to accomplish complete re-solution of the products of conversion in the oil in the dilution stage.

More recently it has been proposed to modify this process by employing slightly dilute acid in the initial stage, the initial strength of acid being regulated according to the nature of the oil and the conditions of washing so that the conversion of impurities did not proceed to such extent as would result in incomplete re-solution of the products of conversion in the oil.

This modification has resulted in practically complete solution of the sludge problem and represents an extremely valuable contribution to the art, but nevertheless it has been found that in a few cases, particularly where the finished products were required to meet exacting color standards and certain other criterions of purity, the use of slightly dilute acid in the initial stage does not accomplish a sufficient conversion of impurities to enable the finished products to meet rigid specifications of this character.

It is therefore an object of the present invention to provide a process of refining hydrocarbon oil in which the production of acid sludge is substantially completely eliminated or avoided, extremely efficient recovery of acid is made possible and according to which finished products may be obtained in a very high degree of purity without sacrificing other advantages of the general method of washing referred to hereinabove.

My invention has for other objects such other operative advantages or improvements as may be hereinafter found to obtain.

My invention contemplates the treatment of the hydrocarbon oil to be refined with sulphuric acid of high concentration, for example, from 64° to 66° Baumé. The exact concentration of the acid will depend upon the nature of the oil, the conditions of washing, and the degree of purification desired, but in general, since refined products of extremely high purity are desired, the concentration of acid contemplated is such as to result in many instances in the formation of some sludge or similar material incapable of re-solution in the oil upon partial dilution of the acid in the presence of the oil.

After the oil has been agitated with the strong acid a limited amount of water is added, for example, sufficient water to reduce the acid to a concentration of 40° Baumé and the oil and diluted acid are subjected to further agitation. At this point considerable quantities of the products of conversion are re-dissolved in the oil, but since, as set forth hereinabove, the initial concentration of the acid is high, there may result a small or moderate amount of resinous sludge or similar material which does not re-dissolve in the oil.

The diluted acid is then separated from the oil, leaving behind the oil and whatever sludge still remains undissolved, if any, and the mixture of oil and sludge is then agitated with an aqueous liquid such, for example, as water or a solution of alkaline material, such as sodium hydroxide.

I have found that when this is done whatever sludge remains after the initial dilution step is caused to break up or be dispersed in the form of an extremely fine dispersion existing principally in the oil, or else this sludge is wholly or partially dissolved in the oil. Both solution and dispersion may take place, a part of the sludge being dissolved in the oil and the remaining portion being dispersed, but in any event it is possible in this manner to entirely break up the sludge.

The aqueous or alkaline layer is then withdrawn, leaving the oil in purified form, but ordinarily containing sludge or similar material dispersed throughout the same in extremely fine form. This sludge is, however, unobjectionable as it can readily be separated in the usual course of distillation. Considerable quantities of it may also be removed during the neutralization step which ordinarily follows the acid washing step.

It thus becomes possible to obtain a high degree of recovery of the acid employed, since the acid withdrawn after the initial washing is in relatively concentrated state, for example 40° Baumé, and is of an exceptional degree of purity. The oil is also exceptionally pure or may readily be rendered so by further refining and in particular has an extremely high acid stability value. All of these advantages as well as the reduction in the consumption of alkali in the neutralization stage are secured in addition to the elimination of the sludge disposal problem and the conversion of all or substantially all the materials originally present in the oil as impurities into products of unobjectionable nature, that is to say, capable of separation by distillation in the usual manner.

While it will be obvious to those skilled in the art that the amount and concentration of the acid, the amount of water and degree of dilution, the temperature and the time of agitation may be varied over considerable limits, nevertheless the following specific example is believed to be of value as a typical illustration of the manner in which the process of my invention is performed.

Crude light oil obtained from coke oven gas is washed with from 4% to 12% of acid of from 64° to 66° Baumé, the oil and acid being agitated in the usual manner for a period of, for example, 30 minutes. The exact strength of the acid will depend upon the results desired, high color standards for the finished products requiring strong acid for example of 66° Baumé, while in many instances a more dilute acid, for example of 64° Baumé, will be satisfactory and in fact desirable because of the decreased tendency toward sludge-formation which follows the use of the more dilute acid. In any event, the nature of the oil must be taken into consideration.

To the mixture of oil and acid is then added 10% by volume of water and the agitation is continued for a further period of, for example, 30 minutes. The agitation is then stopped and the mixture is allowed to settle, after which the dilute acid is withdrawn, leaving the oil and some sludge behind.

To the oil and sludge there is then added water or an aqueous alkaline solution, for example, a 2% solution of NaOH, in amount equal to, for example, from 5% to 50% of the oil, and agitation is resumed.

After agitation for a suitable period, the mixture is then settled and the water or aqueous layer is then withdrawn. The oil is then subjected to the usual course of refining, including neutralization and distillation.

During the course of distillation, as mentioned hereinabove, the products of conversion present in solution or in suspension in the oil remain behind as residue, which residue may be used as fuel or otherwise disposed of without difficulty. However, since the conversion of materials originally present as impurities has proceeded to a considerable or practically complete extent, the ultimate finished products such, for example, as motor fuel, benzol, toluol, and the like will be found to be possessed of an extremely high degree of purity.

It is not necessary that the acid employed in the first stage is of such strength as to cause the formation of products of conversion of the original impurities in the oil incapable of re-solution in the oil in the initial dilution stage. Some oils may in fact be washed with 66° Baumé sulphuric acid, followed by dilution of the acid to, say, 40° Baumé in the presence of the oil, without the formation of any appreciable amount of permanent sludge.

Even in this case, however, my invention may be employed to advantage, as it results in a higher acid stability value in the oil, although the advantages of my process are most marked in instances where the initial dilution stage fails to accomplish complete re-solution of the products of conversion.

My invention is not limited to the specific example given hereinabove by way of illustration but is to be construed as of the scope of the claims hereinafter made.

I claim as my invention:

1. In the process of refining hydrocarbon oil, the steps which comprise agitating the oil with concentrated sulphuric acid of from 64° to 66° Baumé to cause the substantially complete conversion of materials originally present in the oil as impurities to products of higher boiling points, then diluting the acid while in contact with the oil with an aqueous liquid to effect a re-solution in the oil of all of the products of conversion which are capable of being redissolved in the oil by such dilution step, withdrawing the diluted acid at substantially 40° Baumé while leaving in the oil the remaining products of conversion incapable of being redissolved in the oil by said dilution step and agitating the oil while containing the remaining products of conversion incapable of re-solution after said dilution stage, with from 10% to 50% by volume of an aqueous liquid, and thereby redissolving in the oil the remaining products of conversion that were incapable of being redissolved in the oil by the first aforesaid dilution step, and finally withdrawing the aqueous liquid from the oil.

2. In the process of refining hydrocarbon oil the steps which comprise agitating the oil with sulphuric acid of from 64° to 66° Baumé to cause the substantially complete conversion of materials originally present in the oil as impurities to products of higher boiling points, then diluting the acid while in contact with the oil with an aqueous liquid whereby all of the products of conversion which are capable of being redissolved in the oil by such dilution step are re-dissolved in the oil and others incapable of re-solution remain in insoluble form, withdrawing the diluted acid at substantially 40° Baumé while leaving in the oil the remaining products of conversion incapable of being redissolved in the oil by said dilution step and treating the oil while containing the remaining products of conversion incapable of re-solution with from 10% to 50% by volume of a 2% solution of NaOH and thereby redissolving in the oil the remaining products of conversion that were incapable of being redissolved in the oil by the first aforesaid dilution step and finally withdrawing the aqueous liquid from the oil.

JOHN W. INGRAM.